Figure 1:
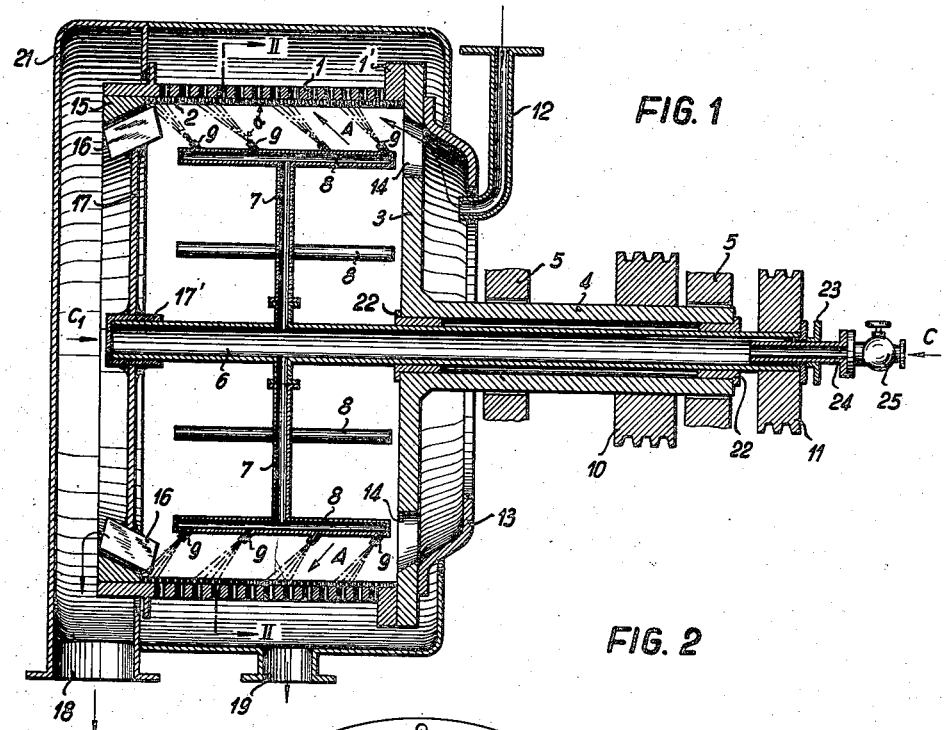

Oct. 21, 1958 L. SCHMIEDEL 2,857,053
MACHINE FOR FLOATING, WASHING AND CONVEYING GROUND MATERIAL
Filed May 13, 1955 3 Sheets-Sheet 1

INVENTOR
Ludwig SCHMIEDEL

ATTORNEYS

Oct. 21, 1958 L. SCHMIEDEL 2,857,053
MACHINE FOR FLOATING, WASHING AND CONVEYING GROUND MATERIAL
Filed May 13, 1955 3 Sheets-Sheet 2
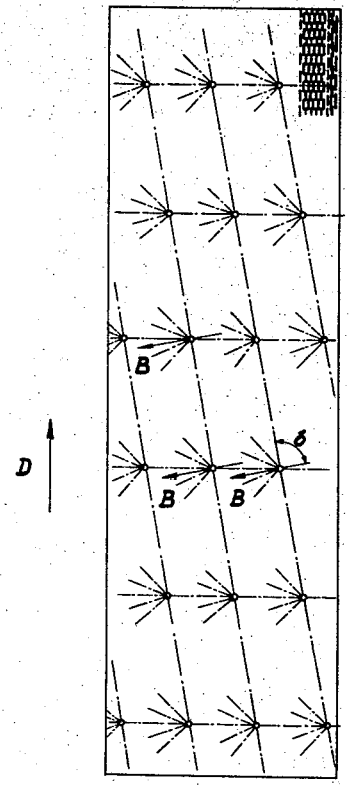
FIG. 3
FIG. 4
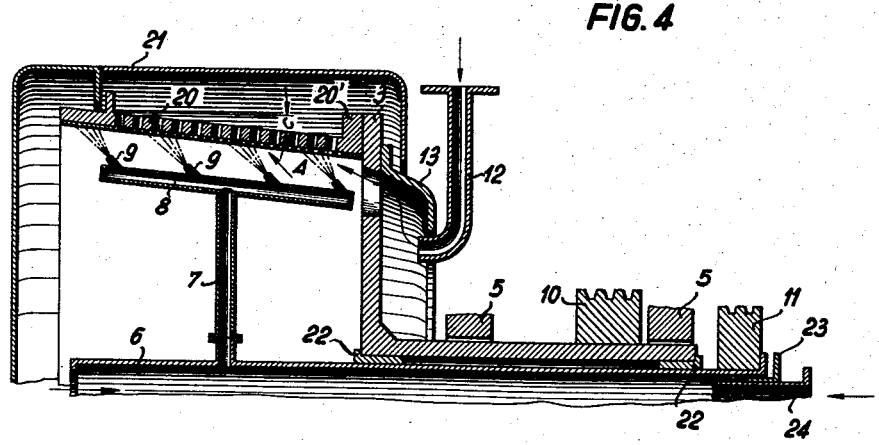
INVENTOR
Ludwig SCHMIEDEL
ATTORNEYS Oct. 21, 1958     L. SCHMIEDEL     2,857,053
MACHINE FOR FLOATING, WASHING AND CONVEYING GROUND MATERIAL
Filed May 13, 1955     3 Sheets-Sheet 3

INVENTOR
Ludwig SCHMIEDEL
By Watson, Cole, Grindle, + Watson
ATTORNEYS

United States Patent Office 2,857,053
Patented Oct. 21, 1958

2,857,053

MACHINE FOR FLOATING, WASHING AND CONVEYING GROUND MATERIAL

Ludwig Schmiedel, Wunstorf-Hannover, Germany, assignor to Starcosa Maschinen- und Apparatebau G. m. b. H., Wunstorf-Hannover, Germany, a firm Application May 13, 1955, Serial No. 508,273

Claims priority, application Germany May 24, 1954

9 Claims. (Cl. 210—211)

This invention relates to a revolving machine for the floating, washing out and conveying of material to be ground, more particularly, disintegrated raw material for the production of starch.

For the production of starch from root plants, e. g., potatoes, manioc, etc. or of cereals, e. g., maize or milo, it is always necessary to disintegrate these raw products, whereby the starch is laid open and the fibrous substances are torn into minute fibres. This so-called ground material consists of fibres, starch, fruit water, albumen etc. The starch must now be separated from the ground material, which on principle takes place by washing out by means of water, if desired with addition of chemicals, such as, for instance, $SO_2$.

For this purpose, apparatuses or installations are known in which the separation of the washing water containing the starch takes place under action of centrifugal force. The mode of operation of these machines consists substantially in that the ground material diluted with water is fed to a centrifugal machine and that the starch-containing water is then centrifuged in the same. In all of these apparatuses the ground material is moved through the machine merely by the action of centrifugal force. These machines thus cannot be termed washing machines but according to their working principle are only screening machines. Since it is not possible to separate all of the starch practically completely with a single separation, this process must be repeated several times. It follows that several of these machines must be employed in a series arrangement.

Furthermore, a centrifugal washer is known in which the washing takes place in the drum of the machine by repeated floating and centrifuging. Special devices are required to achieve the floating, and a special brushing device serves to keep the sieves clean. Owing to the very rough operating conditions these installations are subject to high wear. Conveyer worms serve to move the ground material, but these worms also are subject to wear.

It is an object of the present invention to provide means for washing and conveying the ground material in a more efficient manner and with minimum wear.

With this and further objects in view, according to the present invention nozzles are arranged in the machine in such a way that the ground material is conveyed from the inlet to the outlet by jets of water under pressure which simultaneously act to wash the material and to clean the screening surface.

Other and further objects, features and advantages of the invention will be pointed out hereinafter and appear in the appended claims forming part of the application.

In the accompanying drawings several now preferred embodiments of the invention are shown by way of illustration and not by way of limitation.

Figure 2:
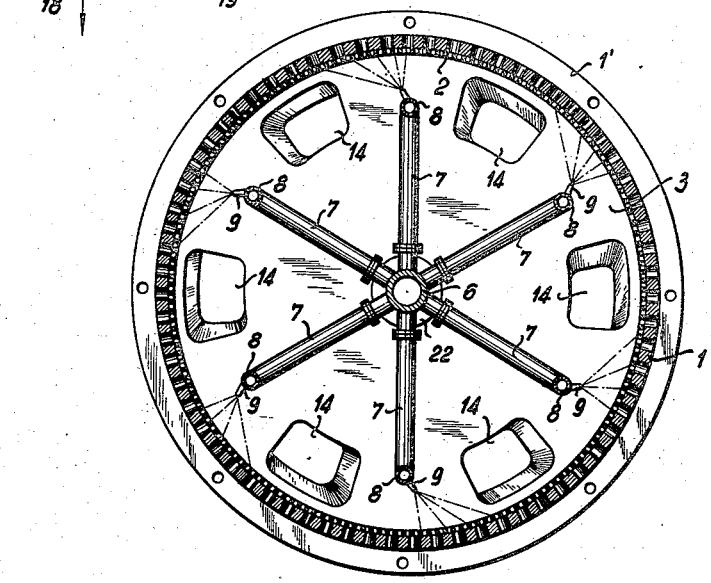
Figure 5:
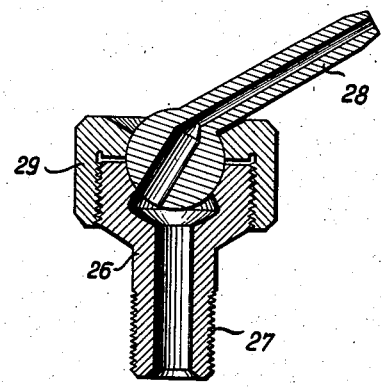
Figure 6:
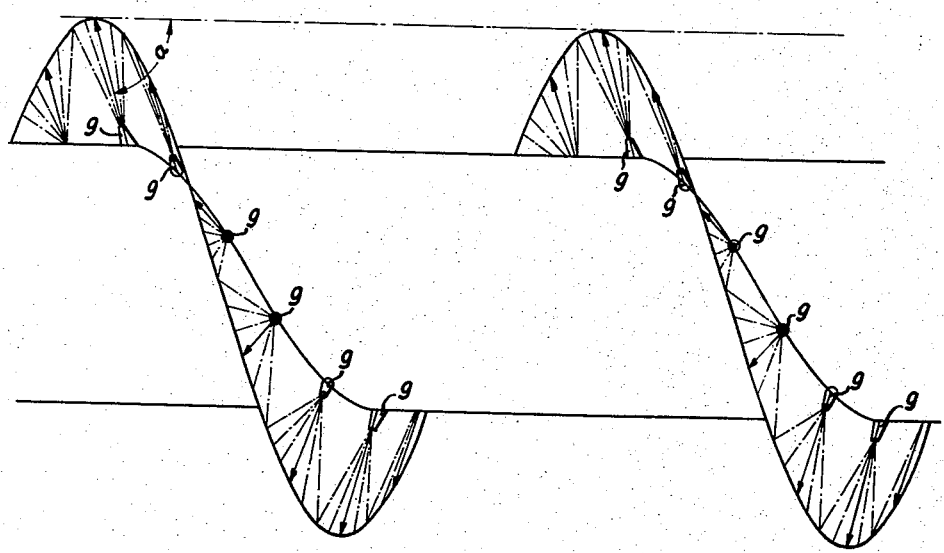

Fig. 1 is an axial section through a machine having the invention applied thereto, Fig. 2 is a cross section on line II—II of Fig. 1, Fig. 3 is a development of the screening insert, showing the inside face thereof, Fig. 4 is a fragmentary axial section of a machine with modified form of the drum, Fig. 5 is a sectional view of a nozzle, and Fig. 6 is a diagrammatic view showing the worm formed by the jets of water ejected by the nozzles.

Similar reference numerals denote similar parts in the different views.

Referring now to the drawings in greater detail, and first to Fig. 7, it will be seen that the washer consists of a perforated drum 1 rotating in a casing 21 and including a screening plate 2 attached to the inner surface thereof. The drum 1 is secured by a flange 1' to an end plate 3 mounted on a hollow shaft 4 which is supported in bearings 5. Coaxially mounted for rotation within the hollow shaft, by sleeves 22, is a tube 6 having arms 7 and transverse tubes 8. Each of the cross tubes 8 carries nozzles 9. Water under pressure is fed into the tube 6 at C through a control valve 25 for regulating the pressure and a stuffing box 23, 24, for discharge through the nozzle 9, in the direction A, or at an angle "a" in relation to the screen surface, which angle may amount to 25–80°, depending on the nature of the ground material. If desired, the opposite end $C_1$ of the tube 6 may also be connected to a source of water under pressure. A V-belt pulley 10 is mounted on the hollow shaft 4 and a V-belt pulley 11 is mounted on the tube 6, for driving the shaft 4 and the tube 6 from a driving shaft (not shown) in such a way that a predetermined relative speed is existing between the hollow shaft 4 with the drum 1 and the tube 6 with the nozzles 9. The ground material is introduced into a feed tube 12 and passes through a ring 13 into the drum; to this end the end plate 3 of the drum is provided with openings 14 at several points.

In general it is desirable to obtain the washed out material with a minimum amount of moisture. The drum, therefore, is provided at its delivery end with a conical ring 15. With this arrangement it is necessary to remove the ground material from the drum after the washing process. To this end, obliquely arranged blades 16 are provided on arms 17 which are mounted on the tube 6 by means of a hub 17'. Since the blades 16 have a relative speed with respect to the drum 1 and so also to the ring 15, the ground material is moved outwards in case of a suitable obliquity of the blades 16. The ground material leaves the machine through a branch 18. The suspension of starch centrifuged through the sieve 2 of the drum 1 leaves the machine through a branch 19.

The nozzles 9 are arranged so as to direct their jets against the inner side of the drum according to a special system. For instance, Fig. 3 shows an arrangement in which the jets form a double worm surface and Fig. 6 shows an arrangement in which the jets form a single worm surface. By the inclination of the nozzles in the direction of arrow A in Fig. 1 and in the direction of arrow B in Fig. 3 the material which is hit by the jet of the nozzle is conveyed. The angle "b" in Fig. 3 between the nozzle and the worm line may be about 90°. Of course, a certain amount of hydraulic pressure is necessary to this end. The actual pressure depends upon the kind of the ground material, the smoothness of the screen and the centrifugal force exerted by the revolving drum and may range between 1 and 10 atmospheres gauge pressure. It is not difficult to adjust the liquid or water pressure accordingly by the control valve 25, Fig. 1. This may be effected either according to the requirements of the ground material; it is also possible, however, to alter or regulate the liquid pressure at the nozzle during operation. Also the direction of the nozzles 9, and hence of the nozzle jets, must be adapted to the material to be ground. To this end, the nozzles may be made adjustable as hereinafter described in greater detail, with reference to Fig. 5. A change of the adjustment, such as it is required with a new type of ground material, will be carried out at standstill of the machine. The relative motion of the nozzles with respect to the screening surface takes place in the direction D, Fig. 3. It follows that each nozzle by washing off the ground material creates a free screening surface into which the succeeding nozzle can wash the ground material, thereby conveying the same from the inlet to the outlet end of the drum.

With these revolving washers the ground material is conveyed through the screening drum exclusively by several directed jets of water, with simultaneous repeated floating and dewatering of the ground material through the screening surface of the drum. Hereat, the screening surface is continuously cleaned by the impinging jets of water.

It will be appreciated that ground material with high adhesion will stick more intimately to the screening surface under action of the centrifugal force, than fine-grained, slimy material. In order to ensure a better conveyance of adhesive material through the screening drum it is also contemplated to use a conical drum 20 with flange 20' as per Fig. 4 in place of a cylindrical drum as per Fig. 1. However, the conicity or taper should not be so large that the material is passed through the drum under action of centrifugal force, but the conveying should be effected exclusively by the obliquely directed jets of water of the nozzles. An angle of 0–40° comes into question, depending on the nature of the ground material. With a very adhesive material, the conical ring 15 possibly may be dispensed with, more particularly where no value is attached to a low degree of moisture of the washed material.

Fig. 5 shows an adjustable nozzle unit, comprising a socket member 26 whose lower end is formed with a male thread 27, a nozzle 28 whose lower end is spherically shaped to fit in a spherically curved seating surface of the socket member 26, and a cap nut member 29 which is also formed with a spherical seating surface and threadably engaged with a male thread of the socket member 26 for holding the nozzle in its adjusted position.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

I claim:

1. A machine for floating, washing and conveying ground material, and more particularly, disintegrated raw material for the production of starch, comprising a fixed casing, a centrifugal screening drum mounted for rotation in said casing, a nozzle carrier mounted for rotation in relation to said drum, a plurality of nozzles mounted on the carrier each nozzle being directed in such a way that the jets issuing from it have a component in the conveying direction and a component directed at an angle thereto for discharging from the nozzles jets of water which are moved over the inner surface of the screen at a predeterminate angle and means for removing the separate components from the casing.

2. A machine for floating, washing and conveying ground material, and more particularly, disintegrated raw material for the production of starch, comprising a fixed casing, a centrifugal screening drum mounted for rotation in said casing, means for feeding the machine with the material to be treated, a nozzle carrier mounted for rotation in relation to said drum, a plurality of nozzles adjustably mounted helically on the carrier at such an angle so that water discharged therefrom acts in a direction to convey the material along said drum, and means for supplying to said nozzles water under pressure for discharging from the nozzles jets of water which are moved over the inner surface of the screen at a predetermined angle and means for removing the separate components from the casing.

3. A machine for floating, washing and conveying ground material, and more particularly, disintegrated raw material for the production of starch, comprising a fixed casing, a centrifugal screening drum mounted for rotation in said casing, a nozzle carrier mounted for rotation in relation to said drum, supported by a central tube for the washing liquor, a plurality of nozzles mounted on the carrier, each nozzle being directed in such a way that the jets issuing from it have a component in the conveying direction and a component directed at an angle thereto for discharging from the nozzles jets of water which are moved over the inner surface of the screen at a predeterminate angle and means for removing the separate components from the casing.

4. A machine for floating, washing and conveying ground material, and more particularly, disintegrated raw material for the production of starch, comprising a fixed casing, a centrifugal screening drum mounted for rotation in said casing, a nozzle carrier mounted for rotation in relation to said drum, supported by a central tube for the washing liquor and consisting of tubes approximately parallel to the screen and combined by radial tubes with the central water tube, a plurality of nozzles mounted on the carrier each nozzle being directed in such a way that the jets issuing from it have a component in the conveying direction and a component directed at an angle thereto for discharging from the nozzles jets of water which are moved over the inner surface of the screen at a predetermined angle and means for removing the separate components from the casing.

5. A machine for floating, washing and conveying ground material, and more particularly, disintegrated raw material for the production of starch, comprising a fixed casing, a centrifugal cylindrical screening drum mounted for rotation in said casing, a nozzle carrier mounted for rotation in relation to said drum, supported by a central tube for the washing liquor, a plurality of nozzles mounted on the carrier, each nozzle being directed in such a way that the jets issuing from it have a component in the conveying direction and a component directed at an angle thereto for discharging from the nozzles jets of water which are moved over the inner surface of the screen at a predeterminate angle and means for removing the separate components from the casing.

6. A machine for floating, washing and conveying ground material, and more particularly, disintegrated raw material for the production of starch, comprising a fixed casing, a centrifugal screening drum mounted for rotation in said casing, a nozzle carrier mounted for rotation in relation to said drum, a plurality of nozzles mounted on the carrier, each nozzle being directed in such a way that the jets issuing from it have a component in the conveying direction and a component directed at a predeterminate angle thereto for discharging from the nozzles jets of water which are moved over the inner surface of the screen at a predeterminate angle and means for removing the separate components from the casing.

7. A machine for floating, washing and conveying ground material, and more particularly, disintegrated raw material for the production of starch, comprising a fixed casing, a centrifugal cylindrical screening drum mounted for rotation in said casing, a nozzle carrier mounted for rotation in relation to said drum, supported by a central tube for the washing liquor, a plurality of nozzles mounted on the carrier each nozzle being directed in such a way that the jets issuing from it have a component in the conveying direction and a component directed at an angle thereto for discharging from the nozzles jets of water which are moved over the inner surface of the screen at a predeterminate angle, a conical ring at the delivery end of the drum coacting with scraping blades having a relative speed with respect to the drum and also to the conical ring and means for removing the separate component from the casing.

8. A machine for floating, washing and conveying ground material, and more particularly, disintegrated raw material for the production of starch, comprising a fixed casing, a centrifugal conical screening drum mounted for rotation in said casing, means for feeding the machine with the material to be treated, a nozzle carrier mounted for rotation in relation to said drum, a plurality of nozzles mounted helically on the carrier, each nozzle being directed in such a way that jets of water issuing therefrom act to convey the material along said drum and means for supplying to said nozzles water under pressure for discharging from the nozzles jets of water which are moved over the inner surface of the screen at a predetermined angle and means for removing the separate components from the casing.

9. A machine for floating, washing and conveying ground material, and more particularly, disintegrated raw material for the production of starch, comprising a fixed casing, a centrifugal conical screening drum mounted for rotation in said casing, means for feeding the machine with the material to be treated, a nozzle carrier mounted for rotation in relation to said drum, a plurality of nozzles mounted helically on the carrier, and means for supplying to said nozzles water under pressure for discharging from the nozzles jets of water which are moved over the inner surface of the screen at a predetermined angle thereto, one component thereof acting in a direction to convey the material along said drum, and means for removing the separate components from the casing, the conicity of the screening drum being so small that the conveying of the ground material is caused by the nozzle jets rather than by the centrifugal force.

References Cited in the file of this patent

UNITED STATES PATENTS

| | | |
|---|---|---|
| 535,306 | Stewart | Mar. 5, 1895 |
| 1,030,973 | Cappage | July 2, 1912 |
| 1,926,402 | Pearce | Sept. 12, 1933 |
| 2,037,840 | Weston | Apr. 21, 1936 |
| 2,184,598 | Jahn | Dec. 26, 1939 |